(12) United States Patent
Lambot

(10) Patent No.: US 9,933,697 B2
(45) Date of Patent: Apr. 3, 2018

(54) PROJECTION SUBSYSTEM FOR HIGH CONTRAST PROJECTION SYSTEM

(71) Applicant: BARCO N.V., Kortrijk (BE)

(72) Inventor: Daniel Lambot, Leuze-en-Hainaut (BE)

(73) Assignee: BARCO N.V., Kortrijk (BE)

( * ) Notice: Subject to any disclaimer, the term of this patent is extended or adjusted under 35 U.S.C. 154(b) by 0 days.

(21) Appl. No.: 15/100,868

(22) PCT Filed: Dec. 3, 2014

(86) PCT No.: PCT/EP2014/076378
§ 371 (c)(1),
(2) Date: Jun. 1, 2016

(87) PCT Pub. No.: WO2015/082529
PCT Pub. Date: Jun. 11, 2015

(65) Prior Publication Data
US 2016/0299417 A1      Oct. 13, 2016

(30) Foreign Application Priority Data
Dec. 3, 2013   (GB) .................................. 1321305.3

(51) Int. Cl.
| G03B 21/28 | (2006.01) |
| G03B 33/12 | (2006.01) |
| G02B 27/10 | (2006.01) |
| G03B 21/00 | (2006.01) |
| G03B 21/20 | (2006.01) |
| H04N 9/31 | (2006.01) |
| H04N 5/74 | (2006.01) |
| G02B 27/14 | (2006.01) |

(52) U.S. Cl.
CPC ......... *G03B 33/12* (2013.01); *G02B 27/1026* (2013.01); *G02B 27/1066* (2013.01); *G02B 27/149* (2013.01); *G03B 21/008* (2013.01); *G03B 21/2033* (2013.01); *G03B 21/28* (2013.01); *H04N 5/7458* (2013.01); *H04N 9/3105* (2013.01); *H04N 9/3164* (2013.01)

(58) Field of Classification Search
CPC .. G03B 21/28; G03B 21/208; G03B 21/2033; H04N 9/315; H04N 9/3105; H04N 9/3111; H04N 9/3117
See application file for complete search history.

(56) References Cited

U.S. PATENT DOCUMENTS

| 6,349,006 B1 | 2/2002 | Okamori et al. |
| 7,207,678 B2 | 4/2007 | Penn |
| 2003/0142278 A1 | 7/2003 | Yamamoto |

(Continued)

FOREIGN PATENT DOCUMENTS

DE      102012011202 A1      9/2013

OTHER PUBLICATIONS

International Search Report (ISR) dated Jun. 22, 2015, for PCT/EP2014/076378.
Written Opinion dated Jun. 22, 2015, for PCT/EP2014/076378.
Partial Search Report dated Mar. 27, 2015, for PCT/EP2014/076378.

(Continued)

*Primary Examiner* — Sultan Chowdhury
(74) *Attorney, Agent, or Firm* — Bacon & Thomas, PPLC

(57) ABSTRACT

A projection subsystem for a high contrast projection system is described including three digital micro-mirror devices (MMD) and three prism assemblies and a crossed dichroic prism assembly, the prism assemblies having dual TIR prisms.

23 Claims, 5 Drawing Sheets

(56) References Cited

U.S. PATENT DOCUMENTS

| | | | |
|---|---|---|---|
| 2003/0151834 A1 | 8/2003 | Penn | |
| 2004/0109140 A1* | 6/2004 | Kiser | G02B 26/08 |
| | | | 353/31 |
| 2005/0018146 A1 | 1/2005 | Chang et al. | |
| 2005/0057729 A1* | 3/2005 | Huang | G03B 21/005 |
| | | | 353/33 |
| 2005/0168708 A1 | 8/2005 | Huang | |
| 2006/0209420 A1 | 9/2006 | Lerner et al. | |
| 2007/0024945 A1 | 2/2007 | Huang | |
| 2007/0076173 A1 | 4/2007 | Chen et al. | |
| 2009/0190101 A1* | 7/2009 | Alasaarela | G02B 5/04 |
| | | | 353/81 |
| 2010/0283921 A1* | 11/2010 | Li | G03B 33/12 |
| | | | 348/756 |
| 2012/0170001 A1* | 7/2012 | Sawai | G02B 27/285 |
| | | | 353/20 |

OTHER PUBLICATIONS

Second Written Opinion dated Nov. 3, 2015, for PCT/EP2014/076378.
International Preliminary Report on Patentability (IPRP) dated Apr. 1, 2016, for PCT/EP2014/076378.
British Search Report dated Apr. 30, 2014, for GB 1321305.3.
Jung, "High Fill-Factor Two-Axis Gimbaled Tip-Tilt-Piston Micromirror Array Actuated by Self-Aligned Vertical Electrostatic Combdrives", Journal of Microelectromechanical Systems, vol. 15, No. 3, Jun. 2006.

* cited by examiner

PROJECTION SUBSYSTEM FOR HIGH CONTRAST PROJECTION SYSTEM

The present invention relates to projector subsystems and projectors having a prism assembly and a recombination device such as projection systems which recombine the light reflected off several digital micro mirror devices with a dichroic combiner also known as cross dichroic assembly or X-cube.

BACKGROUND OF INVENTION

Existing projection systems equipped with three micro mirror devices make extensive use of so called Philips prism assemblies to illuminate the micro-mirror devices and to combine the fundamental colours reflected by the micro-mirror devices.

Prism assemblies in these projectors must be designed carefully to prevent light not selected to be projected (i.e. light reflected by pixels in another state than the ON state as well as light reflected by edges and surfaces next to and under the pixels of the micro-mirror devices) to ruin the contrast of the projection system.

One type of micro mirror device is an FTP DMD, in the micro-mirrors can be tilted by +/−12 degrees around a diagonal. The illumination light must come from a direction perpendicular to this tilt axis and this light is parallel to the pixel's diagonal or at 45 degrees with respect to the DMD's horizontal pixels rows. The light reaches the micro-mirrors at an incidence angle of 24 degrees. Depending on the micro mirror tilt angle (−12, 0, +12 degrees respectively), the illumination light is reflected into specific directions corresponding to an ON state, a FLAT (rest) state and an OFF state respectively.

The illumination light cone and the ON state light cone are usually separated from each other by means of a TIR (total internal reflection) prism assembly. In the case of a 3 chips projector, the colour splitting and recombining Philips trichroic prism assembly is inserted between the TIR prism and the 3 DMD's.

The FLAT state light cone and the OFF state light cone are usually separated from the ON state light cone by a suitable aperture in the projection lens.

A new type of DMD spatial light modulator called TRP or "Tilt and Roll Pixel" has been developed having a movement of micro mirrors (the "pixels") is different than in the case of a classical FTP DMD. In a TRP DMD the movement of the individual micro mirrors is more complex and may be seen as a compound rotation around two perpendicular axes. The FLAT or rest state is obviously the same as for a classical FTP DMD, but the ON and OFF states are different. In the ON state, the micro mirror ends up in a position that can be approximated as being the result of a tilt around one of the (square) pixel median lines (horizontal or vertical). In the OFF state light, the micro mirror ends up in a position that can be approximated as being the result of a tilt around the other (square) pixel median line.

With the arrival of the new type of micro mirror devices, where a new type of micro-mirror known as Tilt-and-Roll Pixel (TRP) is used, it has become even more challenging to design prism assemblies that will efficiently isolate the light reflected by ON pixels from unwanted light reflected by the micro mirror devices.

In the case of a 3 chips projector, the Philips prism architecture is a very popular one, but its use with TRP DMD's raises additional problems as well:

The incidence angle of the illumination light cone must now be 34 degrees (in air) instead of 24 degrees. As a consequence, the "dichroic shift" phenomenon, responsible of big light losses in the Philips prism assembly, and caused by the different incidence angle, onto the dichroic mirrors, for the illumination light and the ON state light will be even more severe with TRP chips than with FTP chips.

For the same reason, a redesign of the TIR prism will be necessary (other angles), unevitably leading to a bigger assembly and thus to a longer backworking distance for the projection lens (increasing the PJ lens cost).

U.S. Pat. No. 7,207,678 B2 describes a dual TIR prism for better OFF state light removal, which is limited to single chip architectures and FTP DMD's. The description in U.S. Pat. No. 7,207,678 of a 3 chips engine includes a Philips prism and only one illumination TIR prism in front of the colour splitting. There is also no adaptation foreseen for application of a dual TIR prism on a recombination X-cube nor for the fast OFF state light removal in the case of TRP DLPs.

SUMMARY OF THE INVENTION

An object of the present invention is that at least some embodiments provide a simple yet efficient prism assembly and recombination device that will maintain the contrast of high contrast projection system and that can be used with the new generation of TRP micro mirror devices.

The present invention solves the problems of previous projection systems by recombining the light reflected off several digital micro-mirror devices with a dichroic combiner also known as cross dichroic assembly or X-cube.

In an aspect the present invention provides a projection subsystem for a high contrast projection system comprising three digital micro mirror devices (MMD) and three prism assemblies and a crossed dichroic prism assembly, the prism assemblies comprising dual TIR prisms.

In another aspect the present invention provides a projection subsystem for a high contrast projection system according to the invention comprises three micro-mirror devices (MMD) and three prism assemblies and a crossed dichroic prism assembly, each one of the digital mirror devices mounted in a package having an optical window 4 and being associated to one of the three prism assemblies, for each MMD 4' and associated prism assembly said window 4 directly faces a first side 1a of a first prism 1; a second side 1b of said first prism 1 faces a first side 2a of a second prism 2 and parallel therewith, the first side 2a of second prism 2 and a first air gap AG1 between said first and second prisms provide a first TIR surface having a first (specified—the critical angle is specified because it is determined by the refractive indices of the materials on both sides of the surface) critical angle for reflecting unwanted light being reflected off the surface of said MMD 4' and away from second prism 2 preferably towards a heat sink to be absorbed;

a second side 2b of said second prism 2 faces a first side 3a of a third prism 3 and parallel therewith, the second side 2b of second prism 2 and a second air gap AG2 between said second and third prisms provide a second TIR surface having a second (specified—the critical angle is specified because it is determined by the refractive indices of the materials on both sides of the surface) critical angle; a second face 3b of said third prism 3 facing an entry side of a crossed dichroic prism assembly.

In a further aspect of the invention, the third prism 3 provides an equal optical working distance on both sides of the projection cone for the ON pixel projection light.

The incoming illumination may enter through a third surface 2c of said second prism 2 to reach second TIR surface 2b of said second prism 2 at an angle greater than that of said critical angle. Said illumination light is then reflected off said second TIR surface through said second and first prisms, respectively, on to the reflective surface of said MMD.

Light reflected off the ON pixels of said MMD and striking first TIR surface with an angle of incidence less than the critical angle of said first TIR surface, pass through said second and third prism and into the cross dichroic prism assembly.

The first TIR surface is adapted to reflect the unwanted light reflected from the OFF pixels and FLAT pixels of said MMD passing through said first prism 1. The unwanted light strikes said first TIR surface at an angle greater than the critical angle of said TIR surface and is immediately reflected off said first TIR surface away from said projection path, into an heat sink, thereby separating unwanted light from projected light (that is light reflected by ON pixels), increasing the contrast of the projection system. Unwanted light is not limited to the light reflected by FLAT and OFF pixels, unwanted light is also reflected from flat surfaces and edges, in, around, and under the pixels or micro mirrors of said MMD passing through said first prism 1. As with the light reflected off FLAT and OFF pixels, said light strike the first TIR surface at an angle greater than the critical angle of said TIR surface and is immediately reflected off said first TIR surface away from said projection path, into an heat sink, thereby separating said unwanted light from said projected light, increasing the contrast of the projection system.

In a further independent aspect of the present invention, the vertices or extremities defined by the intersection of the second side 2b of the second prism 2 and of the second side 1b of the first prism 1 are outside of the light cone or light bundle formed by the light reflected from the ON pixels of the MMD 4'. This will prevent artefacts from being formed on the projected image caused by the vertices of the second and/or third prism. In a first approximation, it will suffice that the intersection of the plane containing the first TIR surface with the plane containing the second TIR surface lies outside of the light cone formed by the light reflected by the ON pixels of the MMD 4'.

The use of TRP with bottom illumination makes the structure compact. For an FTP structure with a Manhattan type pixel design, i.e. illumination happens in the diagonal direction on the pixel structure, the whole TIR structure has to be put at a 45° angle, which will make it bigger, as the area in between the vertices mentioned above has to be made bigger.

In a further aspect of the invention, the illumination light entering a prism assembly is a fundamental color. Each of the three prism assemblies will receive illumination light of a different fundamental color and each micro-mirror device will be illuminated by a fundamental color. For instance, the illumination light entering the first prism assembly is red; the illumination light entering the second prism assembly is green and the illumination light of the third prism assembly is blue. The first micro-mirror device is illuminated by red light, the second micro-mirror device is illuminated by green light and the third micro-mirror device is illuminated by blue light.

In an alternative embodiment, the incoming illumination may enter through a third surface 1c of the first prism 1 at an angle greater than that of said critical angle of said first TIR surface, said illumination light being reflected off said first TIR surface it goes on through said first prism 1 on to the reflective surface of said MMD 4'.

The illumination light reflected off the ON pixels of said MMD 4' and striking the first TIR surface at an angle less than the critical angle of said first TIR surface, passes through the first TIR surface and continue through the second prism 2, the second TIR surface and the third prism 3 and enters the crossed dichroic prism assembly or X-cube 5. The unwanted light being reflected from the OFF pixels and FLAT pixels of said MMD 4' passes through said first prism 1 and second prism 2 and strikes the second TIR surface at an angle greater than the critical angle of said TIR surface, and is immediately reflected off the second TIR surface away from the projection path, into an optical heat sink, thereby separating said unwanted light from said projected light, increasing the contrast of the projection system. The same thing happens with the unwanted light reflected from flat surfaces and edges, in, around, and under said the pixels of said MMD passing through said first prism 1 and second prism 2.

In another aspect the present invention provides a projection subsystem for a high contrast projection system comprising three micro mirror devices (MMD) and three prism assemblies and a crossed dichroic prism assembly, each one of the digital mirror devices mounted in a package having an optical window and being associated with one of the three prism assemblies, for each one micro mirror device (MMD) and associated prism assembly said window directly facing a first side 1a of a first prism 1; a second side 1b of said first prism 1 facing a first side 2a of a second prism 2 and parallel therewith, the first side 2a of second prism 2 the edge defined by the intersection of the second side 2b of the second prism 2 and of the second side 1b of the first prism 1 are outside of a light cone or light bundle formed by the light reflected from ON pixels of the one micro mirror device (MMD).

The present invention also includes a projector including a projector subsystem according to any of the embodiments of the present invention.

DEFINITIONS

Figure 1:
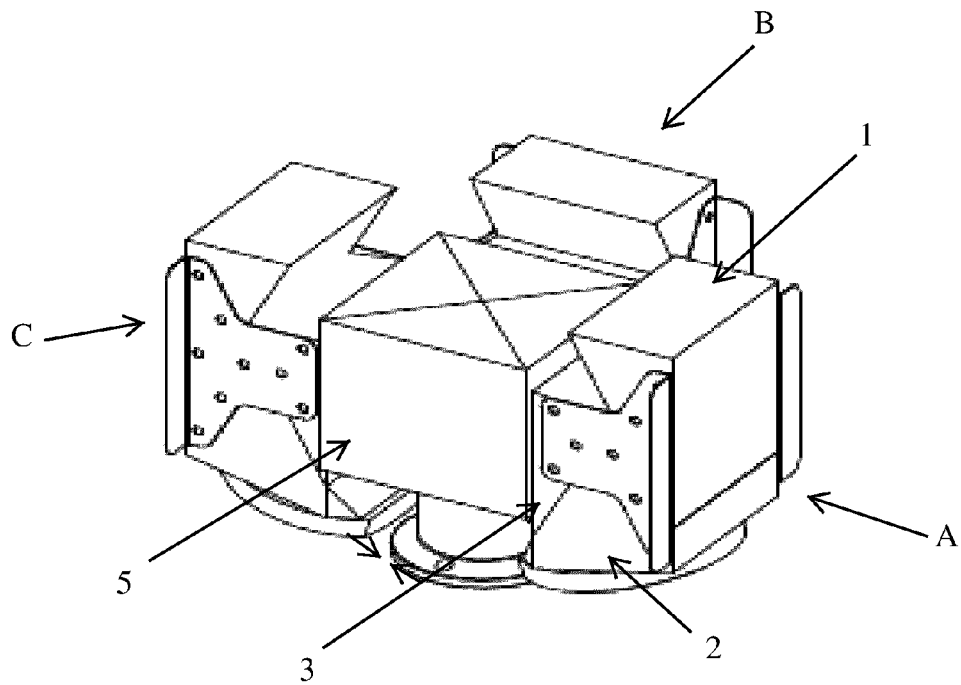
FIG. 1. Perspective view of dichroic combiner cube with three prism assemblies according to an embodiment of the present invention.

The term "micro mirror device" or MMD is sometimes also referred to as a DMD or Digital Micromirror Device. Such a device is capable of DLP (Digital Light Processing). An MMD or DMD functions as a spatial light modulator. It comprise an array of movable or deformable small mirrors, each of which can be addressed separately. MMD and DMD are interchangeable terms.

The term "FLAT pixels" refers to other light that is reflected from some flat surfaces such as flat surfaces and/or edges, in, around, and under the pixels of the micro-mirrors of the DMD or MMD. Such light is unwanted.

'FLAT state light' is light being reflected from FLAT pixels (i.e. mirrors in their resting position which usually never happens during operation) or light being reflected from other structures, e.g. in, around, under etc. the pixels of the micro-mirrors of the DMD or MMD in the same way as if the pixel would be flat. With a spatial light modulator there can be ON-state light, OFF-state light and FLAT-state light. A substantial contributor to FLAT state light can be the cover-window of the MMD or DMD, which even when provided with an anti-reflective (AR) coating still reflects a small part of the incoming light. This cover is a general structure on top of all the individual mirrors of the MMD or DMD.

"Tilt and Roll" or TRP relates to a type of MMD or DMD. These may have a side Manhattan pixel element array or corner Manhattan and side diamond arrays of mirrors. The micromirrors have hinge rotation between an ON and an OFF state. For the corner hinge axis with rotation about a diagonal in a corner Manhattan arrangement array where element sides are aligned in rows, the light in the ON state is received in the left upper corner of a mirror and is reflected perpendicularly up toward the projector lens for display. In the OFF state, the light is received down and reflected toward the lower right corner. For the side diamond array with element diagonals aligned along rows, the operation is similar. In the ON state, light enters the left corner and is reflected up toward the projector lens. In the OFF state, light from the light is received and reflected to the right.

DETAILED DESCRIPTION OF EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions unless it is specifically stated as such. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

The projector subsystem and projector of the present invention can be used with both classical FTP DMD's as well as with the new TRP DMD's. The total (compound) TRP tilt angle is about 17 degrees, which gives almost twice as much optical étendue for the same chip size, compared with a classical FTP DMD. Another significant difference is that the illumination light must come from a direction parallel to the sides of the pixels, that is for example from the bottom (when the plane of the TRP is vertical) or from the side of the DMD chip depending on the ON state micromirrors position.

Still another difference is the relative distribution, in the angular space of the illumination, of the ON state, FLAT state and OFF state light cones. The illumination, ON state and FLAT state light cones are still distributed along a straight line, like the FTP DMD, but the OFF state light cone goes in a direction which is no longer aligned with the other light cones. Embodiments of the present invention deal with the fact that the OFF state light goes in a skew direction and provide a good management of this OFF state light.

In the case of a FTP DMD optical engine (single chip or 3 chips), embodiments of the present invention the OFF state light is allowed to travel through the whole prism assembly, without being disturbed by any obstacle, and exit it at the top where it can be absorbed by a suitable light sink.

With a TRP DMD, embodiments of the present invention prevent that the OFF state light hits the side of the TIR prism assembly and thus avoid the light being scattered by structural elements like a grinded side surface, a chamfered edge, a mechanical fixture. Embodiments of the present invention, prevent this scattered light or a substantial part of to find its way up to the projection lens aperture, which would reduce the contrast ratio of the projector. For example, if only 1% of the OFF state light passes through the projection lens aperture, then the maximum achievable contrast ratio will be 100:1. This is a reduction by a factor 20 compared to the typical contrast ratio of 2000:1 currently achieved by DLP projectors.

Another disadvantage of the TRP architecture is that the OFF state light cone is relatively closer to the ON state light cone (in angular space). It is thus more difficult to separate them from each other.

With respect to the utilisation of a crossed dichroic prism assembly or X-cube, a design having splitting of white light into primary colours and a recombination of these primary colours using one or more crossed dichroic prism assembles such as X-cubes for both steps and using single TIR prisms is less preferred.

Embodiments of the present invention can have one or both of the following advantages:

1) Have a better OFF state light management, e.g. to avoid contrast degradation, in the case of a 3 chips TRP projector.
2) Have a more compact e.g. shorter back working distance optical engine than the available with a Philips prism assembly.

Any or all of the embodiments of the present invention address the problem of the OFF state light by adding an additional TIR surface close to the DMD to remove the OFF state light. This additional TIR surface preferably comes into the same prism assembly as the other TIR surface, i.e. the illumination one. There is thus 2 TIR surfaces for each DMD, so that the structure can be called a dual TIR prism. Having them in one component allows for a more compact device, i.e. a shorter back working distance. Three of these "single chip like" engines are combined with a crossed dichroic prism assembly or X-cube to form a projector subsystem.

Any one or all embodiments of the present invention can make use of a crossed dichroic prism assembly or X-cube on the output side of an MMD which comprises 2 crossed dichroic surfaces which reflect two different primary colours. The third primary is given by what the red and blue mirrors do not reflect. There is for example, a blue mirror and a red mirror. The blue mirror is adapted to reflect the light with a wavelength shorter than a certain value (i.e. in a blue wavelength range, usually close to 500 nm) and transmit the rest of the spectrum whereas the red mirror should reflect the light with a wavelength longer than a certain value (i.e. in a red zone usually close to 600 nm) and transmit the rest of the optical spectrum.

The spectral characteristic of each dichroic surface depends on the prescription of the the dichroic coating which comprises a multilayer dielectric coating applied on the respective surfaces. As dictated by the laws of electromagnetism, the spectral transmission curve of such a dichroic coating depends on the polarization of the light. For example, the wavelength at which the coating goes from transmissive to reflective, and at which the transmissivity is equal to 50% (the T50 wavelength) is not the same for the s-polarisation as for the p-polarization.

With spatial light modulators like DMD's, the illumination light does not need to be polarized and is thus usually not. It is preferred thus to have a separation between the T50 wavelength for s-light and the one for p-light as small as possible in order to minimize the losses caused by polarization leakage at the dichroic surfaces. This low polarization dependence can be achieved with a careful design of the dichroic coatings, for example by utilising a larger number of layers in the coating prescription in dependence upon the selection of the material for making the mirror, e.g. the type of glass used. The following values may be used for any one or for all of the embodiments of the present invention.

For example, for the blue mirror is adapted to have, if it were to be used as defined in the following, a maximum difference (in absolute value) between the T50 wavelength for s-light and the T50 wavelength for p-light preferably of 24 nm or less and is non-negligible, at an angle of incidence of 45° in glass.

For example, for the red mirror is adapted to have, if it were to be used as defined in the following, a maximum difference (in absolute value) between the T50 wavelength for s-light and the T50 wavelength for p-light preferably of 32 nm or less and is non-negligible, at an angle of incidence of 45° in glass.

Another known issue with X-cubes is the relatively large shift of the T50 wavelength (for both s-light and p-light) when the incidence angle of the light varies. This also causes losses because light with the same wavelength but a different incidence angle will be transmitted/reflected differently.

It is thus preferable to keep this shift as small as possible across the whole angular distribution of the light on the dichroic surfaces. This also can be done by improving the dichroic coating prescription.

For the blue mirror is adapted to have if it were to be used as defined in the following, a maximum shift (in absolute value) of the T50 wavelength preferably of 40 nm or less and is non-negligible for an angle of incidence varying from 37° to 53° in BK7 glass, corresponding roughly to F/2.4 illumination in air.

For the red mirror is adapted to have, if it were to be used as defined in the following, a maximum shift in absolute value of the T50 wavelength preferably of 70 nm or less and is non-negligible for an angle of incidence varying from 37° to 53° in BK7 glass, corresponding roughly to F/2.4 illumination in air.

The problem of the dichroic coatings spectral shift and polarisation split, under variable incidence angle with a crossed dichroic prism assembly such as an X-cube is addressed by embodiments of the present invention. Simulations show that, under the condition that the illumination F/number is kept above a reasonable value (F/2.5), the light losses are of the same order as those generated by the dichroic shift in a standard Philips prism. This "X-cube+3 dual TIR prisms" is so far the most compact solution that has been found and it provides the shortest back working distance while providing a solution to the design problems posed.

Embodiments of the present invention provide illumination optics making use of a part (e.g. 10, 12, 14 or 16 degrees) or the full available étendue of about 17 degrees light cone with the TRP pixel architecture, corresponding to an F/number of about F/1.7. Due to the careful design of the embodiments of the present invention provide an illumination, ON state and FLAT state light cones which can come very close to each other in the angular space. The tilt angle of each TIR surface, i.e. the angle between the TIR surface normal and the optical axis has a value defined by the condition that all rays in the ON state light cone hit the surface at an angle just under the critical angle and all the rays in the illumination light cone or in the FLAT state light cone hit their respective TIR surface at an angle just above the critical angle.

In the case that the illumination optics are designed at a higher F/number than the limit above, the tilt angle of each TIR surface maybe chosen in a range of values because of the angular gap existing between the illumination light and the ON state light, and between the ON state light and the FLAT state light (or the OFF state light) respectively. It is then preferable to minimize those angles in such a way that the critical angle condition is just met by the extreme rays, i.e. those with the smallest incidence angle on the TIR surface, in the illumination light and the FLAT state light respectively. This presents the double advantage of reducing the total thickness of the TIR prism assembly (and thus the back working distance of the projection lens), but also the flare on the projected image that is caused by the tilted airgap, just after each TIR surface, that the ON state light must pass through. If for some reason (e.g. manufacturing tolerances, design optimisation, . . . ) the extreme rays of the OFF state light cones have a smaller incidence angle on the TIR surface than the extreme rays of the FLAT state light cone, than the tilt angle of the FLAT/OFF states TIR surface should preferably be optimized for those rays.

A design having 3 single chip optical engines combined together with an X-cube wherein the same X-cube is used to split the white light into primary colours such as Red, Green and Blue components and to recombine them whereby there are three DMDs each one illuminated by one of the primary colours through its own dedicated TIR prism, has the disadvantage that there is no additional "OFF state" TIR surface. The colour splitting is done at the same incidence angle as the colour recombining at another "level" in the X-cube. There are some drawbacks to this approach:

The OFF state light problem is not considered

The coatings in an X-cube can be angle sensitive and cause light losses by desaturation of the primaries. These must be filtered afterwards with trim filters at the cost of extra light loss). With 2 x-cubes in the light path, this problem will be more acute.

In this design, the colour splitting is done in a region where the light bundle is not telecentric, and this will cause unacceptable colour uniformity problems.

Accordingly for any embodiment of the present invention the same crossed dichroic prism assembly such as an X-cube or different crossed dichroic prism assemblies such as X-cubes are not used to split the light and recombine it. Light splitting can be done but this is preferably done by dichroic mirrors whereas the combining is done by a crossed dichroic prism assembly such as an X-cube.

FIG. 1 shows a perspective view of a crossed dichroic prism assembly such as a dichroic combiner cube 5 also known as X-cube assembled with three prism assemblies (A, B, C) according to an embodiment of the invention.

Each prism assembly is associated with one reflective light valve or spatial light modulator, e.g. a digital micro mirror device also known as a MMD.

Each of the MMDs is illuminated through its associated prism assembly by one primary color. For instance, MMD 4A associated to the prism assembly A is illuminated by red (or R) light; MMD 4B associated to the prism assembly B is illuminated by green (or G) light; and MMD 4C associated to the prism assembly C is illuminated by blue (or B) light.

Figure 8:
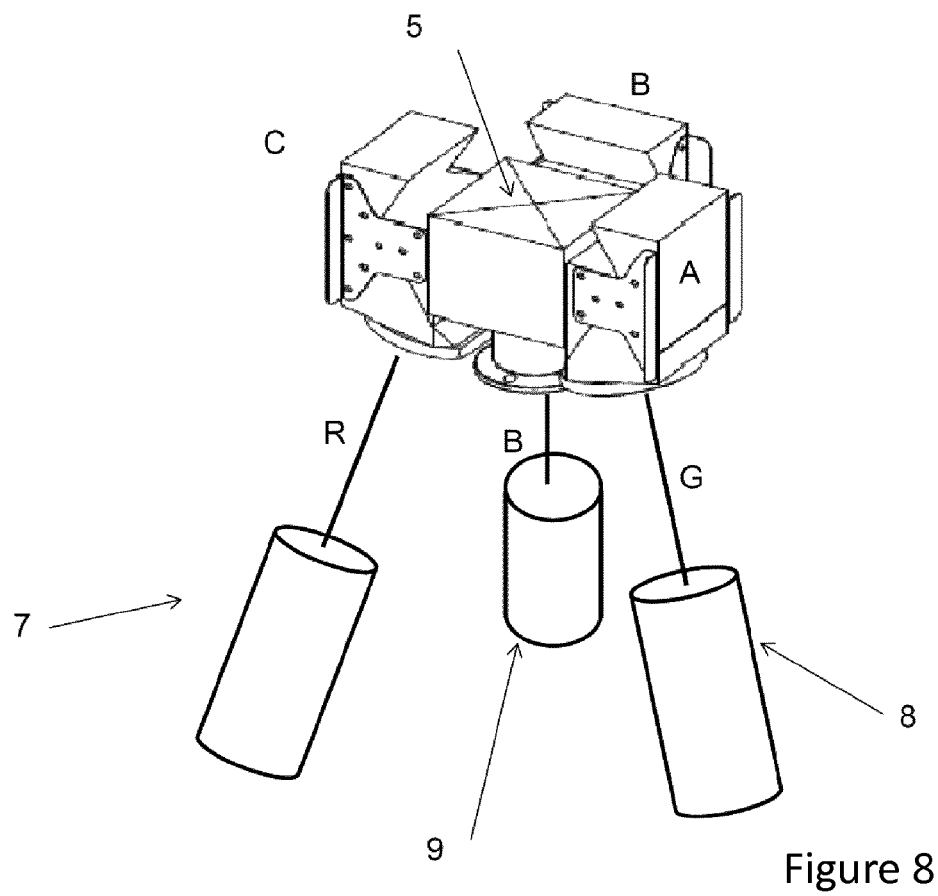
FIG. 8 illustrates a perspective view of dichroic combiner cube with three prism assemblies showing three light sources.

The present invention in any of its embodiments can utilize light sources with the projector subsystem such as coloured lasers, e.g. laser diodes (see FIG. 8 which shows three primary colour light sources 7, 8, 9). Advantages of laser light sources are that they are intense and have an almost perfectly monochromatic light spectrum with a line width of one to a few nm. As the critical angle for internal reflection depends on the wavelength of the light, this mean that only one critical angle needs to be considered at any internal reflection. However the present invention in any of its embodiments can make use of light emitting diodes (LED). These have a line width greater than for lasers, e.g. 30 to 50 nm, which results in a range of angles for critical reflection. Preferably narrow line width LED's are used. These can be surface or side emitting LEDs whereby edge emitting LEDs may have a smaller line width.

Light sources such as quantum dots (QDs) can be used for example in photonic crystal nanocavities and microdisk resonators.

Figure 2:
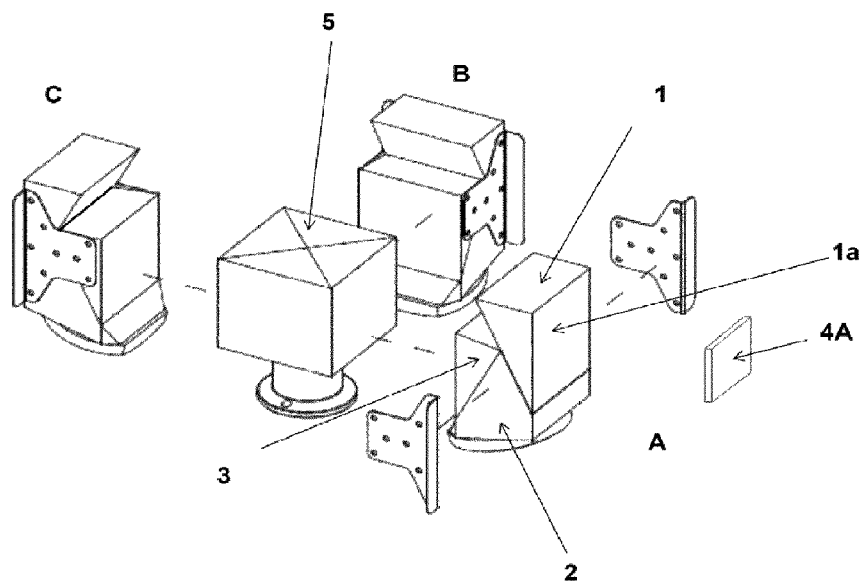
FIG. 2. Exploded view of the dichroic combiner cube with three prism assemblies according to an embodiment of the present invention.

FIG. 2 shows an exploded view of the dichroic combiner 5 and its three associated prism assemblies A, B and C according to an embodiment of the present invention. Only MMD 4A associated with prism assembly A is shown.

Figure 3:
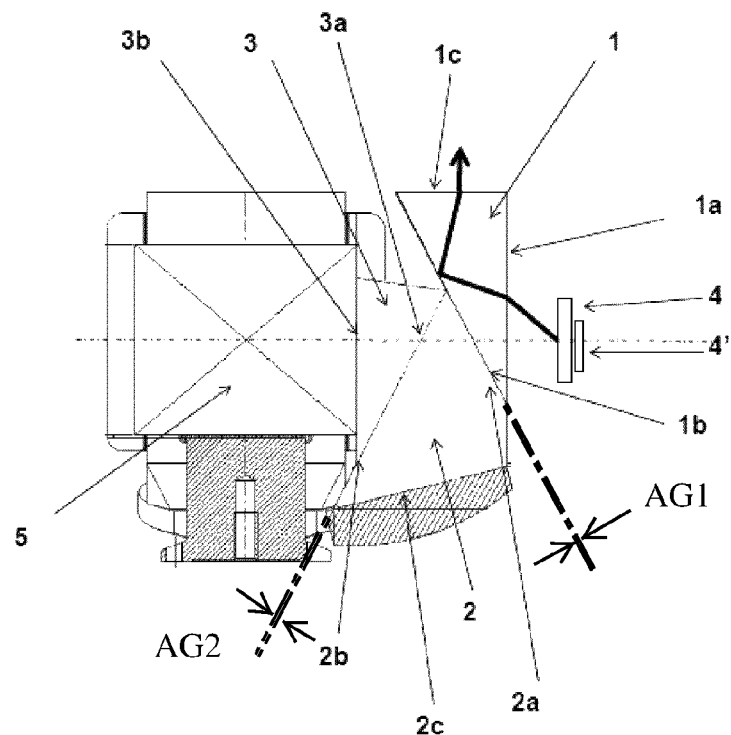
FIG. 3. Cross section of dichroic combiner and one prism assembly showing total reflection of light not selected to be imaged on the first TIR surface according to an embodiment of the present invention.
Figure 4:
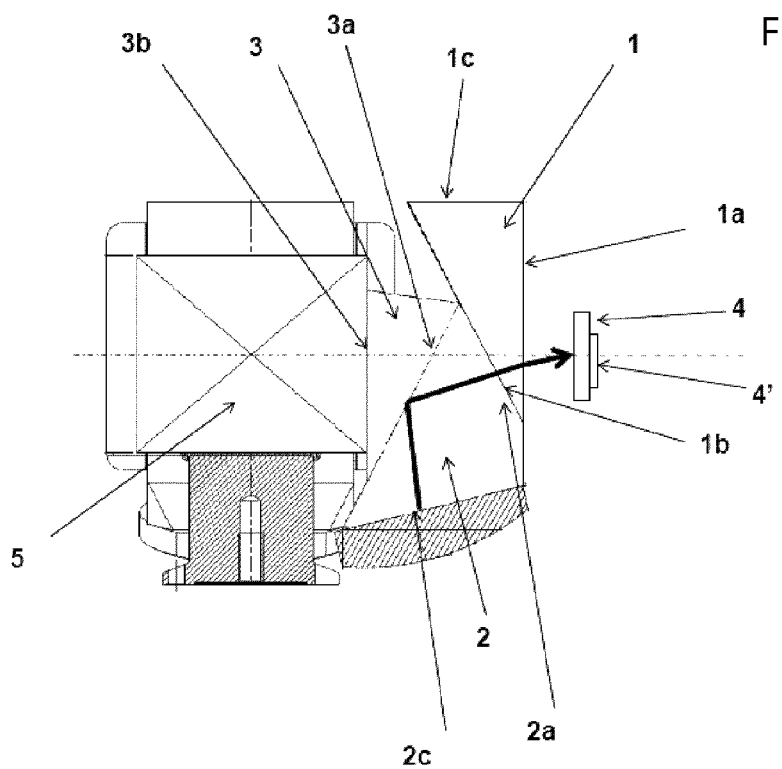
FIG. 4. Cross section of dichroic combiner and one prism assembly showing total reflection of illumination light on the second TIR surface according to an embodiment of the present invention.
Figure 5A:
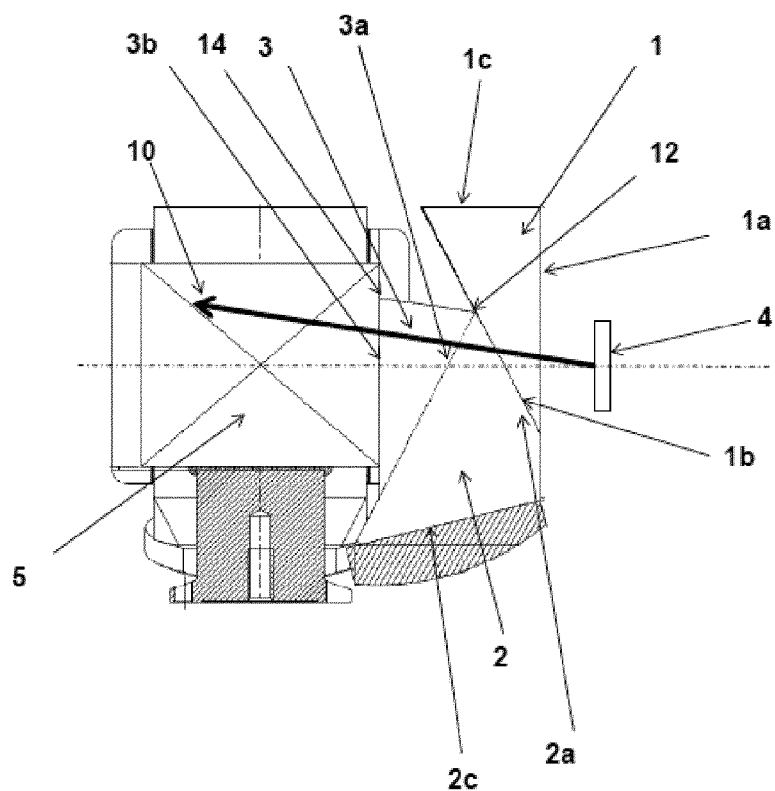
FIGS. 5A and 5B. Cross sections of a dichroic combiner and one prism assembly showing light selected to be imaged travelling through prism assembly and into the X-cube according to an embodiment of the present invention.
Figure 5B:
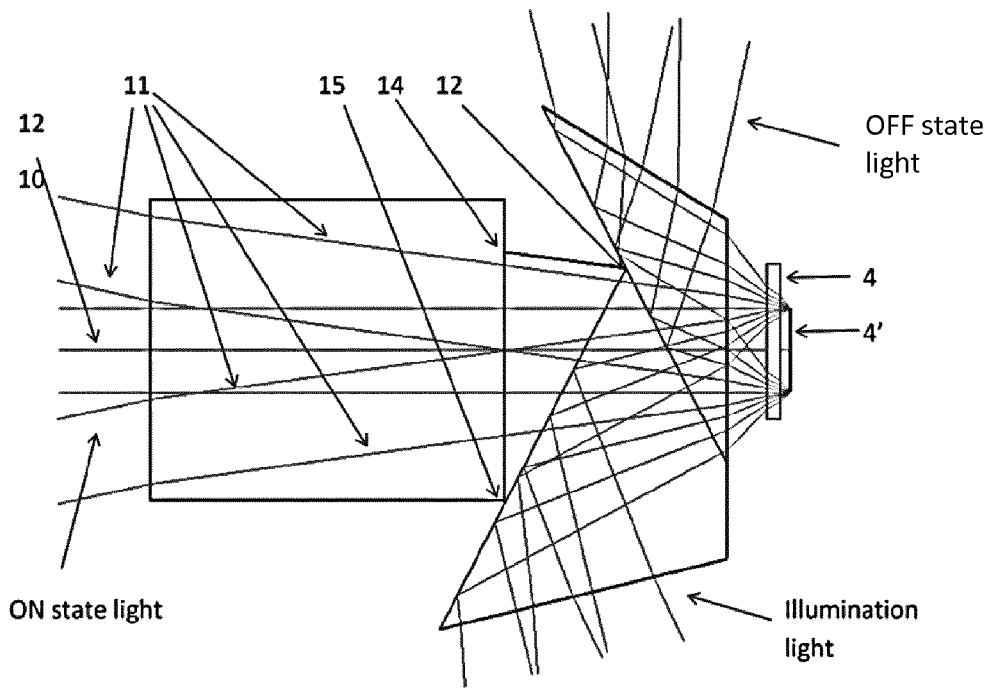

For the sake of clarity let us consider prism assembly A. Prism assemblies B and C are identical, mutatis mutandis, to prism assembly A. FIGS. 3, 4 and 5 show a cross section of the dichroic combiner 5 and prism assembly A.

The window 4 of MMD 4' faces a first side 1a of a first prism 1. The window 4 has a larger area than the micromirror 4' itself.

First prism 1 is separated from a second prism 2 by an air gap AG1. If prisms such as glass prisms are abutted to each the airgap is present implicitly. A second side 1b of first prism 1 is facing a first side 2a of second prism 2. Second side 1b of first prism 1 is preferably parallel to the first side 2a of second prism 2. Instead of air, a transparent material with an index of refraction smaller than the index of refraction of the material of prism 1 would work too. Different refractive indices will affect the critical angles and hence the geometry, i.e. the angles of the TIR prisms. The second side 1b will form a first total internal reflection (TIR) surface. That is, light travelling through prism 1 and striking said first TIR surface with an angle of incidence greater than the critical angle of said first TIR surface will be reflected back.

The term 'reflected back' should be understood to mean 'reflection according to the law of reflection, i.e. a reflected or mirrored angle and not that this can be interpreted as 'travelling back in exactly the same direction as the incoming light, in opposite sense'.

Note that the relevant rules that describe this behavior at optical interfaces are 1) the law of reflection, 2) Snell's law, and 3) the Fresnel equations. For instance the critical angle for TIR is also a consequence from the Fresnel equations, and depends on the ratio of the refractive indices of the glass and the lower index medium like air.

In particular, light reflected by MMD 4' and striking said first TIR surface with an angle of incidence greater than the critical angle of said first TIR surface is reflected back through prism 1 towards a third side 1c of prism 1 to be absorbed by an optical heat sink (not shown). The first TIR surface is adapted to reflect the light not selected to be imaged by the projection system i.e. the light of pixels in the OFF state or the flat state and the light reflected from flat surfaces and edges, in, around, and under the pixels of MMD 4' and propagating through first prism 1.

Light reflected by MMD 4' and striking said first TIR surface with an angle of incidence smaller than the critical angle of said first TIR surface will continue through the air gap AG1 and enter the second prism 2 through its first side 2a.

Second prism 2 is separated from a third prism 3 by an air gap AG2. A second side 2b of second prism 2 is facing a first side 3a of third prism 3. Second side 2b of second prism 2 is preferably parallel to the first side 3a of third prism 3. Instead of air, any transparent material with an index of refraction smaller than the index of refraction of the material of prism 2 would work too. Different refractive indices will affect the critical angles and hence the geometry, i.e. the angles of the TIR prisms.

A second side 3b of prism 3 faces a first input side of the crossed dichroic prism assembly or X-cube. The second side 3b is preferably parallel to said input side of the crossed dichroic prism assembly or X-cube.

Light to illuminate the micro-mirrors of the MMD 4' enters through a third side 2c of the second prism 2 usually perpendicularly to side 2c. The light is usually collimated through a lens seen on the cross sections of FIGS. 3, 4 and 5. In these drawings the lens is shown abutting or attached to the TIR prism. This is not a requirement of the present invention, the lens can equally be at some distance to the prism.

The angle between the second side 2b and third side 2c of the second prism 2 is chosen so that the illumination light entering the second prism 2 through the third side 2c will strike the second TIR surface at an angle greater than the critical angle of said second TIR and be reflected towards the side 2a with an angle of incidence smaller than the critical angle for that surface. The illumination light reflected on the second TIR surface will thus enter prism 1 through its second side 1b, travel through prism 1 and exit prism 1 through its first side 1a to illuminate the MMD 4'.

The first and second prisms are dimensioned so that the extremities or edges of the second side 2b of prism 2 and the first side 1b are located outside of the light cone delimited by the light rays reflected by the pixels of MMD 4' when they are in the ON state. In particular, the edge at the intersection of the plane containing the first TIR surface with the plane containing the second TIR surface lies outside of the light cone or bundle formed by the light reflected by the ON pixels of the MMD 4'. This is shown schematically in FIG. 5b which shows the illumination light, the ON state light and the OFF state light, the prism assembly and the crossed dichroic prism assembly such as a dichroic combiner cube. A light beam reflected from the centre of a micromirror 4' which is an ON pixel is shown with reference number 10. The window 4 is larger than the micromirror 4' and hence rays 11 from the edges of the micromirror 4' pass some distance from the edges of the widow 4. The dual TIR prism structure is adapted so that this extreme rays 11 pass the edge 12 of the second prism 2 on the same side thereof as the ray 10. Rays 11 are on the ON light cone. In a similar way the rays 11 of ON state light pass the edge 15 of the third prism so that theses rays do not touch nor overlap this edge 15. This means that the ON light beams pass through the prismatic material of the prisms without touching or overlapping an edge of a prism. An edge of a prism may scatter light and hence reduce the qulity of the image projected.

In particular, one may dimension the third and second prisms so that the plane containing first side 3a of the third prism 3 and the plane containing second side 2b of the second prism 2 intersect the second side 1b of the first prism along lines of intersection that are either identical or, when they are not identical, distant by a distance of the same order of magnitude as both the distance between side 2a and side 1b (i.e. AG1) and the distance between side 2b and side 3a (i.e. AG2).

Figure 6:
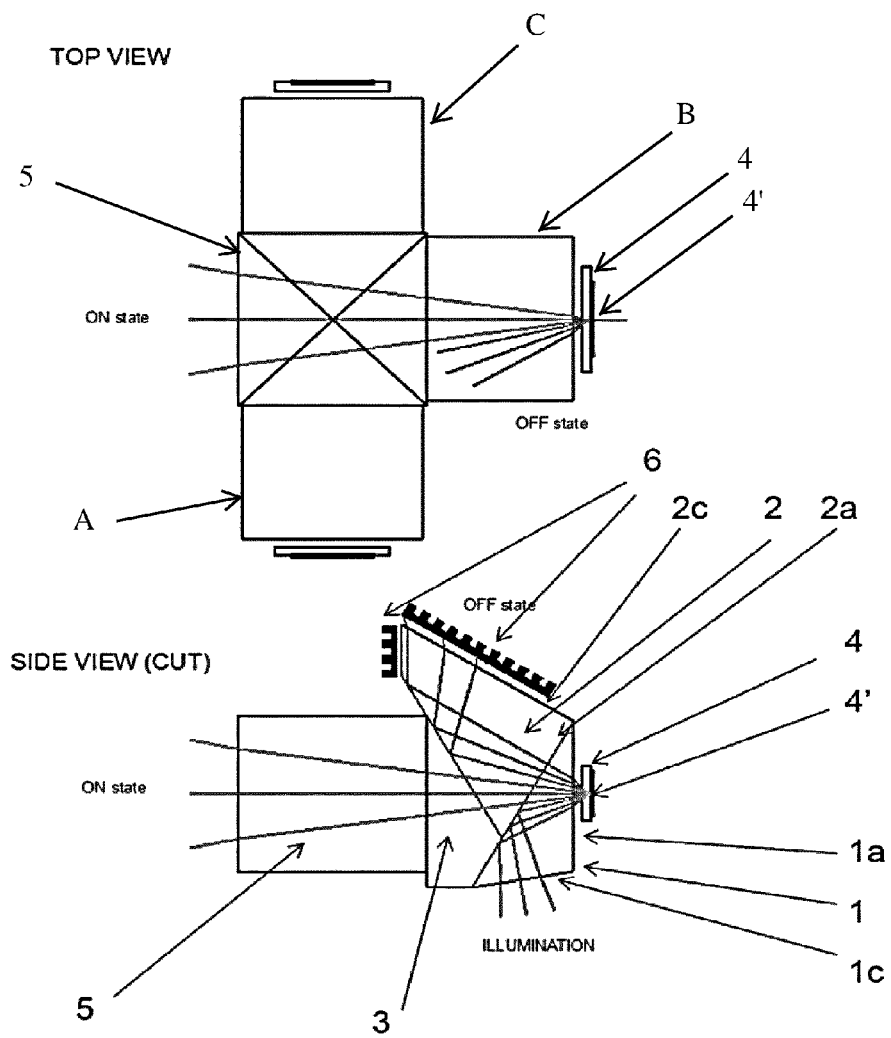
FIG. 6. Cross section of an alternative embodiment for the prism assembly.
Figure 7:
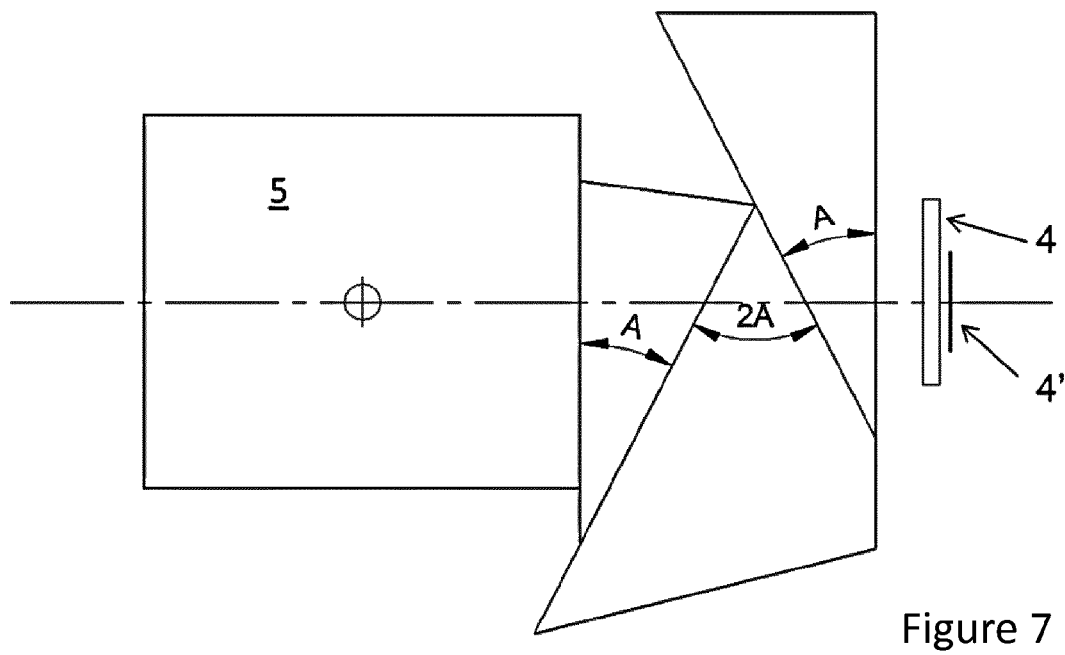
FIG. 7 illustrates angles of a specific embodiment.

In an alternative embodiment shown on FIG. 6, light to illuminate the micro-mirrors of the MMD 4' enters through a third side 1c of the first prism 1. The light is usually collimated through a lens as was described previously.

The angle between the second side 1b and third side 1c of the first prism 1 is chosen so that the illumination light entering the first prism 1 through the third side 1c will strike the first TIR surface at an angle greater than the critical angle of the first TIR surface and be reflected towards the side 1a with an angle of incidence smaller than the critical angle for that surface. The illumination light reflected on the first TIR surface will thus enter prism 1 through its third side 1c, travel through prism 1 and exit prism 1 through its first side 1a to illuminate the MMD 4'.

As was previously described and shown in FIG. 5 for the previous embodiment, to avoid artefacts by edges (corners) of the second prism, the intersection of the planes containing the first and second TIR surfaces are located outside of the light cone delimited by the rays of light reflected by the pixels of MMD4' when they are in the ON state. This means that the ON light beams pass through the prismatic material of the prisms without touching or overlapping an edge of a prism. An edge of a prism may scatter light and hence reduce the quality of the image projected.

Light reflected by MMD 4' and striking the second TIR surface with an angle of incidence greater than the critical angle of said second TIR surface is reflected back through second prism 2 towards a third side 1c of prism 2 to be absorbed by an heat sink 6. In other words, the second TIR surface is adapted to reflect the light not selected to be imaged by the projection system i.e. the light of pixels in the OFF state or the flat state and the light reflected from flat surfaces and edges, in, around, and under said the pixels of said MMD passing through said first prism 1 and second prism 2 before it enters the third prism 3.

Specific Embodiment

The following is a specific embodiment of the present invention which is non-limiting.

Materials used: Glass type is BK7 or similar, with a refraction index varying from 1.514 to 1.528 over the useful wavelength range. The highest index value corresponds to the shortest wavelength.

Only a fraction of the etendue is used and the F/number is limited to F/2.4 instead of the "usable" F/1.7.

The half cone angle is 12 degrees in air for the illumination, the ON-state, the flat state and the OFF-state.

The lowest ray in the ON-state cone (the ray with the biggest incidence angle on the TIR surface 2c) reaches the TIR surface 2c at an incidence angle equal to the critical angle when the TIR angle A is equal to 33.45° for n=1.514 and 33.06° for n=1.528.

The maximum A value (see picture below) that will ensure that all the ON-state rays of all useful wavelengths will pass through the TIR surface 2c is thus 33.06°

The highest ray in the illumination cone (the ray with the smallest incidence angle on the TIR surface 2c) reaches the TIR surface 2c at an incidence angle equal to the critical angle when the TIR angle A is equal to 27.01° for n=1.514 and 26.69° for n=1.528.

The minimum A value that will ensure that all the illumination rays of all useful wavelengths will be reflected by the TIR surface 2c is thus 27.01°

All A-values between 27.01° and 33.06° will work, but one would preferably opt for a value slightly above or equal to 27.01°, in order to minimize the tilt angle of the TIR surface 2c, and its associated airgap, with respect to the optical axis of the projection lens. This, in order to minimize the optical aberrations caused by this tilted airgap in the projected image.

A similar calculation can be done for the other TIR 1b surface that is essentially symmetric with surface 2c (this is because the illumination cone and the flat-state cone are symmetric with respect to the optical axis).

A similar calculation can be done with another F/number value, in order, for example to use more of the available etendue. The rule is: the lowest the F-number the biggest the half cone angle, the smallest the maximum A value, the biggest the minimum A-value and consequently the smallest the range of A-values.

The present invention also includes a projector including a projector subsystem according to any of the embodiments of the present invention.

The invention claimed is:

1. A projection subsystem for a high contrast projection system comprising:
   three digital micro-mirror devices and three prism assemblies and a crossed dichroic prism assembly, each one of the digital micro-mirror devices mounted in a package having an optical window and being associated with one of the three prism assemblies, for each digital micro-mirror device and associated prism assembly said window directly facing a first side of a first prism; a second side of said first prism facing a first side of a second prism and parallel therewith, the first side of second prism and a first air gap between first prism and second prism providing a first TIR surface having a first critical angle; a second side of said second prism facing a first side of a third prism and parallel therewith, the second side and a second air gap between second prism and third prism providing a second TIR surface having a second critical angle; a second face of said third prism facing an entry side of the crossed dichroic prism assembly,
   wherein at least one of the first and second TIR surfaces is adapted for guiding light not selected to be imaged by the projection system away from the second prism, and that at least one of the first and second TIR surfaces is adapted for guiding light from a light source to the micro-mirror device.

2. The projection subsystem according to claim 1, wherein the third prism provides an equal optical working distance on both sides of the light cone delimited by the light reflected off the ON pixels.

3. The projection subsystem according to claim 1, wherein the extremities of the second side of the second prism and the first side are located outside of the light cone delimited by the light rays reflected by the pixels of the digital micro-mirror device when they are in the ON state.

4. The projection subsystem according to claim 1, wherein the intersection of the plane containing the first TIR surface and the plane containing the second TIR surface is located outside of the light cone delimited by the light rays reflected by the pixels of the digital micro-mirror device when they are in the ON state.

5. The projection subsystem according to claim 1, wherein white light is split into primary colors, the splitting not being done by the crossed dichroic prism assembly.

6. The projection subsystem according to claim 1, wherein white light is split by dichroic mirrors.

7. The projection subsystem of claim 1, wherein the crossed dichroic prism assembly is an X-cube.

8. The projection subsystem of claim 1, wherein the digital micro-mirror devices have micromirrors that are movable or deformable by rotation about one or two axes or two orthogonal axes when addressed.

9. The projection subsystem of claim 1, further comprising light sources selected from lasers, laser diodes, surface light emitting diodes, side light emitting diodes, quantum dots.

10. The projection subsystem according to claim 1, wherein the crossed dichroic prism assembly comprises blue and red mirrors and the blue mirror is adapted to have a maximum difference in absolute value between the T50 wavelength for s-light and the T50 wavelength for p-light of 24 nm or less and is non-negligible, at an angle of incidence of 45° in glass, the red mirror is adapted to have a maximum difference in absolute value between the T50 wavelength for s-light and the T50 wavelength for p-light of 32 nm or less and is non-negligible, at an angle of incidence of 45° in glass, the blue mirror is adapted to have a maximum shift in absolute value of the T50 wavelength of 40 nm for an angle of incidence varying from 37° to 53° in BK7 glass, corresponding roughly to F/2.4 illumination in air and the red mirror is adapted to have a maximum shift in absolute value of the T50 wavelength of 70 nm and is non-negligible for an angle of incidence varying from 37° to 53° in BK7 glass, corresponding roughly to F/2.4 illumination in air.

11. A projector including the projection subsystem according to claim 1.

12. A projection subsystem for a high contrast projection system comprising:
   three micro mirror devices and three prism assemblies and a crossed dichroic prism assembly, each one of the digital mirror devices mounted in a package having an optical window and being associated with one of the three prism assemblies, for each one micro mirror device and associated prism assembly said window directly facing a first side of a first prism; a second side of said first prism facing a first side of a second prism and parallel therewith, the first side of second prism the edge defined by the intersection of the second side of the second prism and of the second side of the first prism are outside of a light cone or light bundle formed by the light reflected from ON pixels of the one micromirror device,
   wherein at least one of the first and second TIR surface is adapted for guiding light not selected to be imaged by the projection system away from the second prism.

13. The projection subsystem of claim 12, wherein the second side of the second prism defines a plane containing a first TIR surface and the second side of the first prism defines a plane containing a second TIR surface.

14. The projection subsystem according to claim 12 comprising a third prism for providing an equal optical working distance on both sides of the light cone delimited by the light reflected off the ON pixels.

15. The projection subsystem according to claim 12, wherein at least one of the first and second TIR surface is adapted for guiding light from a light source to the micro-mirror device.

16. The projection subsystem according to claim 12, wherein white light is split into primary colors, the splitting not being done by a crossed dichroic prism assembly.

17. The projection subsystem to claim 12, wherein white light is split by dichroic mirrors.

18. The projection subsystem of claim 12, wherein the crossed dichroic prism assembly is an X-cube.

19. The projection system of claim 12, further comprising light sources selected from lasers, laser diodes, surface light emitting diodes, side light emitting diodes, quantum dots.

20. The projection subsystem according to claim 12, wherein the crossed dichroic prism assembly comprises blue and red mirrors and the blue mirror is adapted to have a maximum difference in absolute value between the T50 wavelength for s-light and the T50 wavelength for p-light of 24 nm or less and is non-negligible, at an angle of incidence of 45° in glass, the red mirror is adapted to have a maximum difference in absolute value between the T50 wavelength for s-light and the T50 wavelength for p-light of 32 nm or less and is non-negligible, at an angle of incidence of 45° in glass, the blue mirror is adapted to have a maximum shift in absolute value of the T50 wavelength of 40 nm for an angle of incidence varying from 37° to 53° in BK7 glass, corresponding roughly to F/2.4 illumination in air and the red mirror is adapted to have a maximum shift in absolute value of the T50 wavelength of 70 nm and is non-negligible for an angle of incidence varying from 37° to 53° in BK7 glass, corresponding roughly to F/2.4 illumination in air.

21. A projector including the projection subsystem according to claim 12.

22. A projection subsystem for a high contrast projection system comprising:
three digital micro-mirror devices and three prism assemblies and a crossed dichroic prism assembly, each one of the digital micro-mirror devices mounted in a package having an optical window and being associated with one of the three prism assemblies, for each digital micro-mirror device and associated prism assembly said window directly facing a first side of a first prism; a second side of said first prism facing a first side of a second prism and parallel therewith, the first side of second prism and a first air gap between first prism and second prism providing a first TIR surface having a first critical angle; a second side of said second prism facing a first side of a third prism and parallel therewith, the second side and a second air gap between second prism and third prism providing a second TIR surface having a second critical angle; a second face of said third prism facing an entry side of a crossed dichroic prism assembly,
wherein the crossed dichroic prism assembly comprises blue and red mirrors and the blue mirror is adapted to have a maximum difference in absolute value between the T50 wavelength for s-light and the T50 wavelength for p-light of 24 nm or less and is non-negligible, at an angle of incidence of 45° in glass, the red mirror is adapted to have a maximum difference in absolute value between the T50 wavelength for s-light and the T50 wavelength for p-light of 32 nm or less and is non-negligible, at an angle of incidence of 45° in glass, the blue mirror is adapted to have a maximum shift in absolute value of the T50 wavelength of 40 nm for an angle of incidence varying from 37° to 53° in BK7 glass, corresponding roughly to F/2.4 illumination in air and the red mirror is adapted to have a maximum shift in absolute value of the T50 wavelength of 70 nm and is non-negligible for an angle of incidence varying from 37° to 53° in BK7 glass, corresponding roughly to F/2.4 illumination in air.

23. A projection subsystem for a high contrast projection system comprising:
three micro mirror devices and three prism assemblies and a crossed dichroic prism assembly, each one of the digital mirror devices mounted in a package having an optical window and being associated with one of the three prism assemblies, for each one micro mirror device and associated prism assembly said window directly facing a first side of a first prism; a second side of said first prism facing a first side of a second prism and parallel therewith, the first side of second prism the edge defined by the intersection of the second side of the second prism and of the second side of the first prism are outside of a light cone or light bundle formed by the light reflected from ON pixels of the one micromirror device,
wherein the crossed dichroic prism assembly comprises blue and red mirrors and the blue mirror is adapted to have a maximum difference in absolute value between the T50 wavelength for s-light and the T50 wavelength for p-light of 24 nm or less and is non-negligible, at an angle of incidence of 45° in glass, the red mirror is adapted to have a maximum difference in absolute value between the T50 wavelength for s-light and the T50 wavelength for p-light of 32 nm or less and is non-negligible, at an angle of incidence of 45° in glass, the blue mirror is adapted to have a maximum shift in absolute value of the T50 wavelength of 40 nm for an angle of incidence varying from 37° to 53° in BK7 glass, corresponding roughly to F/2.4 illumination in air and the red mirror is adapted to have a maximum shift in absolute value of the T50 wavelength of 70 nm and is non-negligible for an angle of incidence varying from 37° to 53° in BK7 glass, corresponding roughly to F/2.4 illumination in air.

* * * * *